United States Patent [19]

Kay

[11] Patent Number: 4,632,201

[45] Date of Patent: Dec. 30, 1986

[54] LATCH MECHANISM FOR A BATTERY HOLDER

[76] Inventor: Ronald D. Kay, 3513 Hazeline, Fort Worth, Tex. 76103

[21] Appl. No.: 790,091

[22] Filed: Oct. 22, 1985

Related U.S. Application Data

[62] Division of Ser. No. 609,458, May 11, 1984, Pat. No. 4,548,433.

[51] Int. Cl.$^4$ .............................................. B60R 18/02
[52] U.S. Cl. .................................... 180/68.5; 248/503; 292/49; 429/100
[58] Field of Search ............................ 180/68.5, 65.1; 248/503; 292/49, 53, 224, DIG. 26; 429/100, 99

[56] References Cited

U.S. PATENT DOCUMENTS

| | | | |
|---|---|---|---|
| 2,551,990 | 5/1951 | Wills | 248/503 |
| 3,561,802 | 2/1971 | Brockway | 292/49 |
| 3,669,481 | 6/1972 | Bergmann | 292/49 |
| 4,033,424 | 7/1977 | Evans | 180/68.5 |
| 4,548,433 | 10/1985 | Kay | 292/49 |

FOREIGN PATENT DOCUMENTS 1212432  3/1966  Fed. Rep. of Germany ..... 180/68.5

Primary Examiner—David M. Mitchell
Attorney, Agent, or Firm—James E. Bradley

[57] ABSTRACT

A latch mechanism is shown which utilizes a pair of latch dogs pivotally mounted on a base member. Each of the dogs has a curved end region which is adapted to contact a curved work surface of an associated stop member. The dogs are pivotable between a release position in which the curved end regions are apart from the work surfaces to allow relative movement between the base member and stop member and an engaged position in which the curved end regions contact the work surfaces. A positive locking action is achieved by providing the dog end regions with a radius of curvature which matches the radius of curvature of the stop member work surfaces, but offsetting the center point of the radius of curvature of the dogs from the pivot points of the dogs. In this way, the end regions and work surfaces fully mate in the engaged position, but are pulled fully apart when moving to the release position.

5 Claims, 3 Drawing Figures

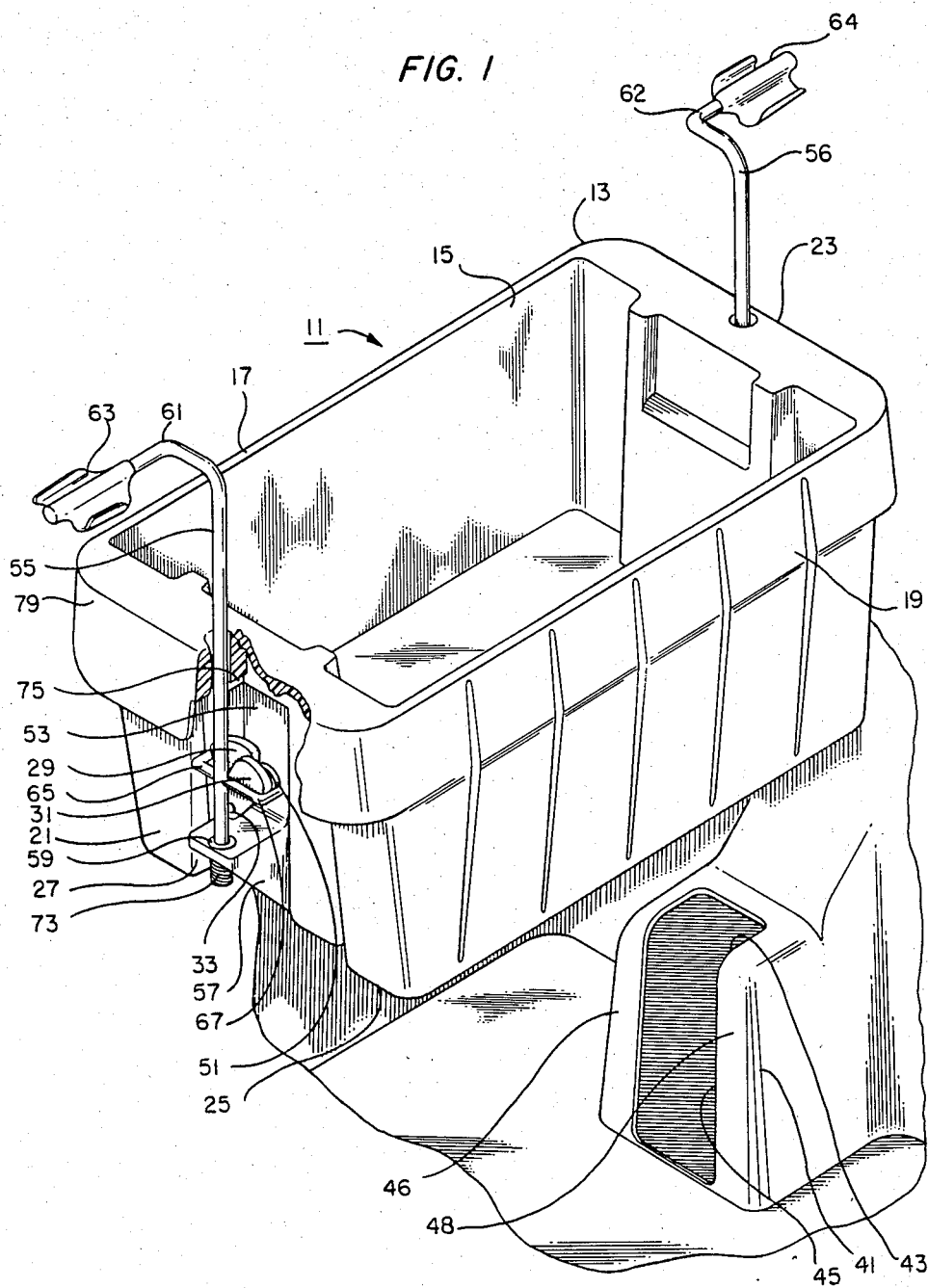

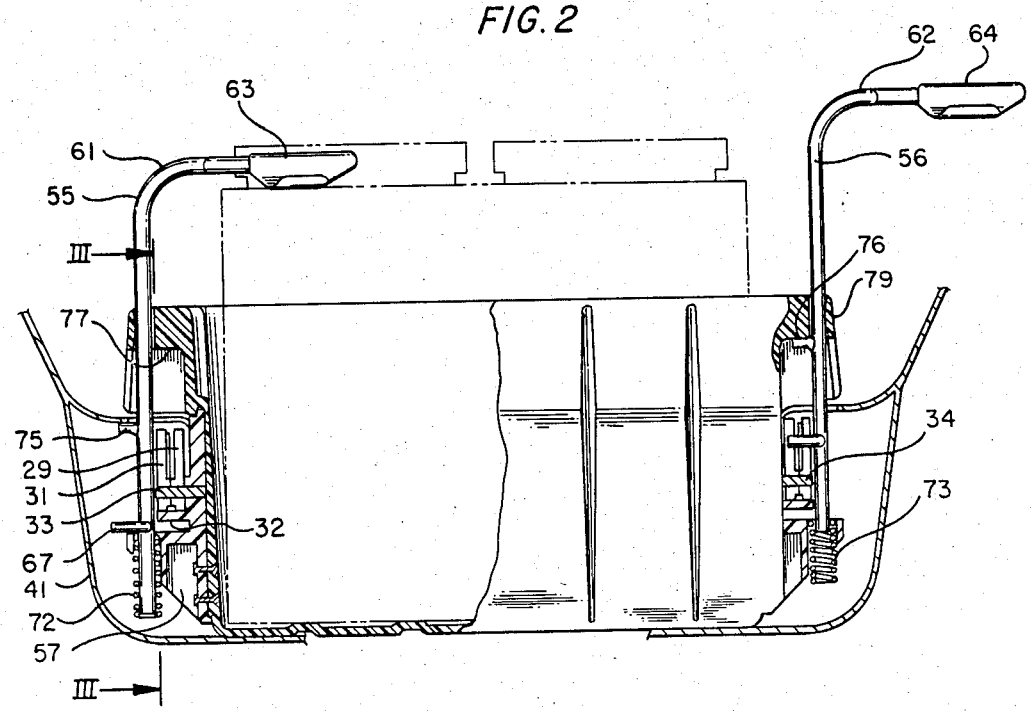
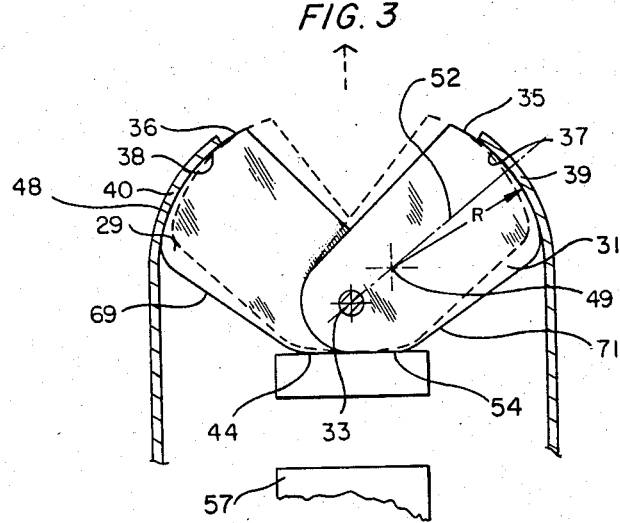

LATCH MECHANISM FOR A BATTERY HOLDER

This application is a division of application Ser. No. 609,458, filed May 11, 1984 now U.S. Pat. No. 4,548,433 issued Oct. 22, 1985.

BACKGROUND OF THE INVENTION

1. Field of the Invention.

The present invention relates to a latch mechanism for releasably coupling two members to each other; more specifically, for coupling a battery case within a recess provided within a fender well of a vehicle.

2. Description of the Prior Art.

Various coupling or latching mechanisms are known in the prior art for releasably coupling two elements. U.S. Pat. No. 2,931,593, issued Apr. 5, 1960, to Pray, shows a bobbin holder which includes a latching mechanism contained within a cylindrical casing or barrel which is actuated by movement of the bobbin itself. U.S. Pat. No. 3,669,481, issued June 13, 1972, to Bergmann, shows a coupling or locking means for two parts which includes a stud belonging to one part, which stud can be inserted against a stop into a locking position in a recess formed in the other part. U.S. Pat. No. 2,533,377, issued Dec. 12, 1950, to Keef, shows a door latch including a pivotally mounted dog. The door may be latched in the closed position when brought into engagement with a cabinet, and may be released by touching the plunger or pressing or pulling against a cabinet member associated with the plunger. U.S. Pat. No. 3,921,334, issued Nov. 25, 1975, to Black, Sr., shows a window guard apparatus that is hingedly mounted to a wall adjacent a window, and which is adapted to prevent entry into the window from the exterior. The window guard mechanism includes a double hinge and an interior fastener.

Although the above references show various fastening and coupling mechanisms, there exists a need for a latch mechanism of simplified design which permits two parts to be reliably coupled together. The latch mechanism should also allow the parts to be released by a simple motion but should provide safe and reliable latching to prevent unauthorized opening. The latch mechanism should be adaptable to a variety of applications, including car doors, hoods, trunks, safety belts, overhead doors, patio doors, and the like.

SUMMARY OF THE INVENTION

The objects of the present invention are accomplished by providing a latch mechanism which has a pair of latch dogs pivotally mounted on a base member. Each of the dogs has a curved end region adapted to contact a curved work surface of an associated stop member. The dogs are pivotable between a release position in which the curved end regions are apart from the work surfaces to allow relative movement between the base member and stop member, and an engaged position in which the curved end regions contact the work surfaces. The radius of curvature of each of the dog end regions matches the radius of curvature of the stop member work surfaces. In this way, the dog end regions fully mate with the work surfaces in the engaged position. However, the pivot point of each of the dogs is offset from the center point of the radius of curvature of the respective dog end region, whereby the dog end regions are pulled fully apart from the stop member work surfaces when beginning to be released.

Additional objects, features and advantages will be apparent in the written description which follows.

BRIEF DESCRIPTION OF THE DRAWINGS

FIG. 1 is a perspective view, partly broken away, of a battery case utilizing the latch mechanism of the invention, showing the installation of the battery case in the fender well of a vehicle.

FIG. 2 is a side, cross-sectional view of the battery case and fender well of FIG. 1, showing a battery in phantom lines.

FIG. 3 is an isolated view of the latch mechanism utilized in the battery case shown in FIGS. 1 and 2.

DETAILED DESCRIPTION OF THE INVENTION

FIG. 1 shows a battery case, designated generally as 11, which illustrates the latching mechanism of the invention. The battery case includes a container 13 having an opening 15 for receiving a battery. The container has sidewalls 17, 19, opposing end walls 21, 23, and a bottom 25.

The end walls 21, 23 of the container 13 are each provided with a cavity 27 into which is received a pair of latch dogs 29, 31. The latch dogs 29, 31 in the embodiment shown, are pivotally mounted on a pivot rod 33, 34 which is located on the exterior of an end wall 21, 23. As shown in FIG. 2, the pivot rod 33 is mounted on the end wall 21, generally perpendicular thereto and perpendicular to the plane of the latch dogs 29, 31. A tab 32 projects outwardly form cavity 27 below latch dogs 29, 31.

As shown in FIG. 3, latch dogs 29, 31 each include a curved end region 35, 36 which is adapted to contact a curved work surface 37, 38 of an associated stop member 39, 40. In the embodiment shown in FIGS. 1 and 2, the stop member 39, 40 can be provided in the form of a molded region 41 in the area of the fender well of a vehicle. The molded region 41 includes an upper opening 43 (FIG. 1) and a downwardly extending channel 45 formed between channel sides 46, 48. The interior surfaces 37, 38 of the molded region 41 adjacent upper opening 43 are suitably molded to assume the general curvature of the latch dog curved end regions 35, 36, as shown in FIG. 3.

The latch dogs 29, 31, are pivotable between a release position, shown in FIG. 1, in which the curved end regions 35, 36 are apart from the work surfaces 37, 38, and an engaged position, shown in solid lines in FIG. 3, in which the curved end regions 35, 36 contact the work surfaces 37, 38. The radius of curvature of each dog end region is approximately the same as the radius of curvature of the associated stop member. This is illustrated by the radius "R", shown for latch dog 31 in FIG. 3. In this way, the convex curved end region 35 of latch dog 31 fully mates in the engaged position with the concave curved work surface 37 of the stop member 39 to prevent relative movement between the latch dog 31 and the stop member 39. Each latch dog 29, 31 has a flat lower or reacting edge 44, 54 that, in the fully engaged position, contacts tab 32 which is a stationary part of container 13. This limits the outward travel of latch dogs 29, 31 if the container 13 is attempted to be pulled upwardly while in the latched position. Any upward force on container 13 is transmitted through tab 32 to the latch dogs 36 and 37 and to the work surfaces 37, 38.

When the latch dogs 29, 31 initially begin to move to the release position, indicated in dotted lines in FIG. 3

(not shown to scale), the dogs will immediately cease contact with the stop members 39, 40. A clearance, indicated by numeral 48, between each end region 35, 36 and each stop member 37, 38 immediately develops. This allows the latch dogs 29, 31 to move to and from a released position without any sliding, frictional contact with stop members 37, 38. This initial clearance is accomplished by positioning the pivot point of pivot rod 33 offset from the center point (49 for dog 31) of the radius of curvature of the latch dog end regions 35 and 36. The distance between the pivot point 33 of each of the latch dogs 29, 31 and the curved end region thereof is greater than the distance between the center point (49 for dog 31) of the radius of curvature and the curved end region (35 for dog 31). Also, the center point 49 is located on or slightly above a radial line 52 extending from pivot point 33 to the center of each curved end region 35, 36, to halfway between the side edges of each dog 29, 31. The center point (not shown) of the radius of curvature for the curved work surfaces 37, 38 coincides with the center point 49 for the dog curved end regions 35, 36. Although the latch dogs are shown pivoting about a common pivot point 33, the dogs could also be pivotally mounted on separate but parallel axes to provide the same offset effect.

The latch dogs 29, 31 are biased toward the engaged position by means of a coil spring 51 (FIG. 1) carried on the pivot rod 33.

The latch mechanism of FIG. 1 also includes a pair of identical but oppositely arranged tension bars 55, 56, each of which is reciprocally mounted on an exterior portion (57 for bar 55) of opposing end walls 21, 23. Tension bar 55 has a longitudinally extent which is mounted through an opening 59 in an exterior portion 57 of case 11, parallel to the end by coil springs 72, 73 which are stretched in tension in the engaged position shown in the left side of FIG. 2. Tension bars 55, 56 also have curved ends 61, 62, including tabs 63, 64. As shown in FIG. 1, tension bar 55 has a pivot region, comprising a pair of L-shaped arms 65, 67 for pivoting the latch dogs 29, 31 between the release and engaged positions in response to vertical reciprocation of tension bar 55.

As shown in FIG. 1, the L-shaped arms 65, 67 extend in opposite directions from the longitudinal axis of the tension bar 55, the outer extents of the arms 65, 67 forming camming surfaces for contacting the outer edges 69, 71 (FIG. 3) of the latch dogs 29, 31. The tension bars 55, 56 have perpendicular ribs 75, 76, which contact the underside 77 of the case outer lip 79 to limit the upward travel of the tension bars as shown in FIG. 1. In the release position of FIG. 1, the rib 75 provides lift support and strength for lifting the battery case by the tabs 63 and 64.

The operation of latch mechanism of the invention will now be described. The battery case 11 is latched into the fender well of a vehicle by moving the tension bars 55 to the position shown in FIG. 1 and on the right half of FIG. 2. In this position, the latch dogs 29, 31 are cammed inwardly to the release position by the action of the tension bar arms 65, 67. The battery case is then lowered into position in the fender well of the vehicle, with the latch dogs 29, 31 passing through the upper opening (43 in FIG. 1) in the fender well. Once the battery case is positioned within the fender well molded region 41, the tension bars 55, 56 are pushed down until arms 65, 67 contact the upper surface of exterior portion 57. As the arms 65, 67 are reciprocated vertically downwardly, the latch dogs are urged apart by coil spring 51 to fully mate with the curved work surfaces 37, 38 (FIG. 3) of the stop members 39, 40. The arms 65, 67 pass on both sides of tab 32. Arms 65, 67 are now below the latch dogs 29, 31, allowing the tension bars 55 to be rotated 180° as shown on the left half of FIG. 2. The clearance between the top of portion 57 and tab 32 allows the rotation. Rib 75 carried on the tension bar 55 now contacts the interior of the molded region 41 to limit the upward travel of the tension bar 55 to the position shown on the left hand side of FIG. 2.

To release the battery case 11, the tension bars 55, 56 are rotated 90°, allowing the rib 75 to leave the interior of the molded region 41. Coil spring 73 biases tension bars 55, 56 upwardly. The tension bars can then be rotated another 90° to engage the arms 65, 67 with the latch dogs 29, 31 and the case 11 can be lifted from the vehicle.

An invention has been provided with several advantages. The latch mechanism of the invention provides a convenient means for releasably coupling a movable member to a stationary member which uses few moving parts. The camming dog action can be used in a variety of applications, such as car doors, hoods, trunks, safety belts, overhead doors, patio doors, and the like. The clearance that occures between the outer edges of the dogs and the stop member when not fully engaged allows locking engagement to occur even though the dogs have not fully moved into the stop member.

While the invention has been shown in only one of its forms, it is not thus limited but is susceptible to various changes and modifications without departing from the spirit thereof.

I claim:

1. A battery case, comprising:
   a container having an opening for receiving a battery, said container having side walls, opposing end walls, and a bottom;
   a pair of latch dogs pivotally mounted on a pivot rod located on the exterior of each of said opposing end walls of said container, each of said dogs having a curved end region adapted to contact a curved work surface of an associated stop member, said dogs being pivotable between a release position in which said curved end regions are apart from said work surfaces to allow relative movement between said container and said stop member and an engaged position in which said curved end regions contact said work surfaces; and
   a tension bar reciprocally mounted on an exterior portion of each of said opposing end walls, each of said tension bars having a pivot region for contacting and pivoting said latch dogs between said released and engaged positions in response to reciprocation of said tension bar.

2. The battery case of claim 1, wherein said latch dogs are biased to said engaged position by a spring carried on said pivot rod.

3. The battery case of claim 1, wherein said pivot region of each of said tension bars comprises a pair of L-shaped arms extending in opposite directions from the longitudinal axis of said tension bar, the outer extents of said arms forming camming surfaces for contacting said latch dogs to pivot said latch dogs.

4. The battery case of claim 3, wherein the radius of curvature of each of said latch dog end regions is approximately the same as the radius of curvature of said stop member work surfaces whereby said dog end regions fully mate with said work surfaces in said engaged position, the pivot point of said dogs being offset from the center point of the radius of curvature of each of said dogs, providing a clearance between said dog end regions and said work surfaces unless said dogs are in a fully engaged position.

5. The battery case of claim 4, in combination with a vehicle fender well wherein said stop member is a cavity formed in the fender well of a vehicle.

* * * * *